Feb. 4, 1941. L. H. ROBERTS 2,230,334
FOLDABLE CONTAINER FOR THE BODY OF MOTOR-DRIVEN VEHICLES
Filed June 7, 1940 2 Sheets-Sheet 1
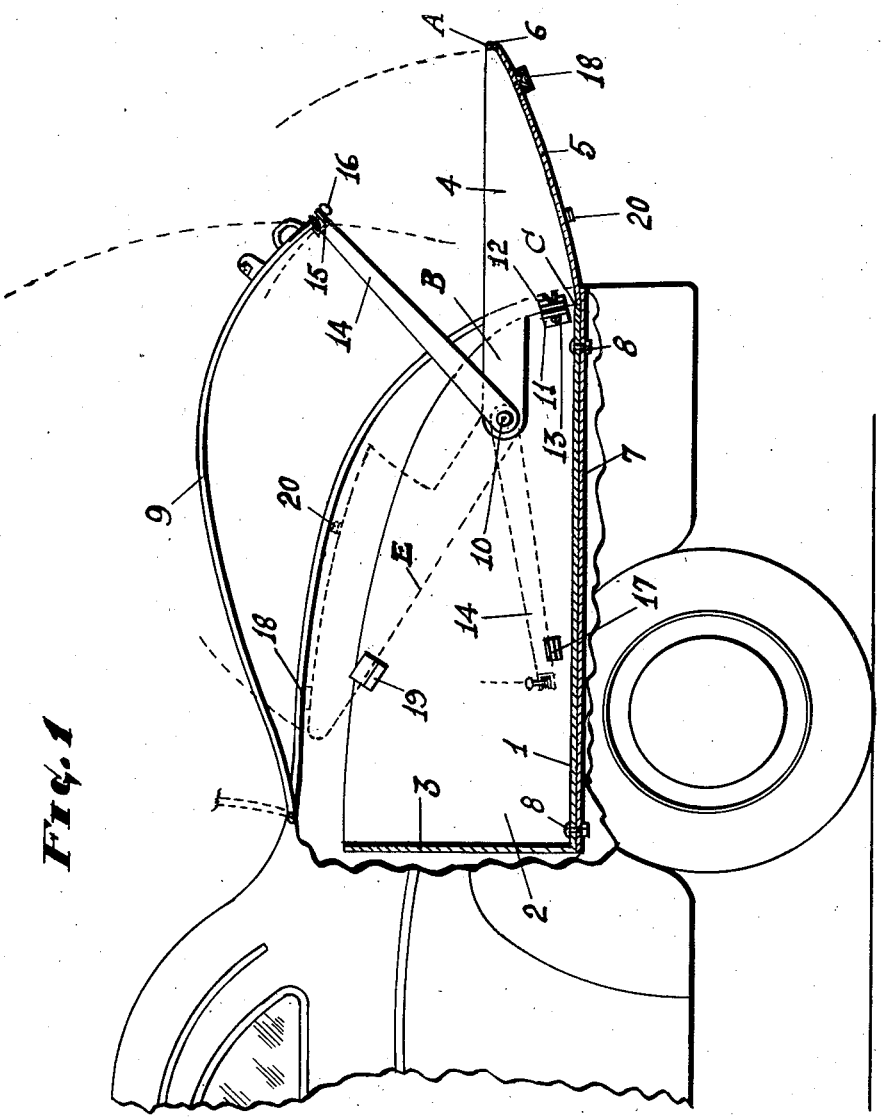
INVENTOR.
L. H. ROBERTS
BY
ATTORNEY.

Feb. 4, 1941.  L. H. ROBERTS  2,230,334
FOLDABLE CONTAINER FOR THE BODY OF MOTOR-DRIVEN VEHICLES
Filed June 7, 1940  2 Sheets-Sheet 2
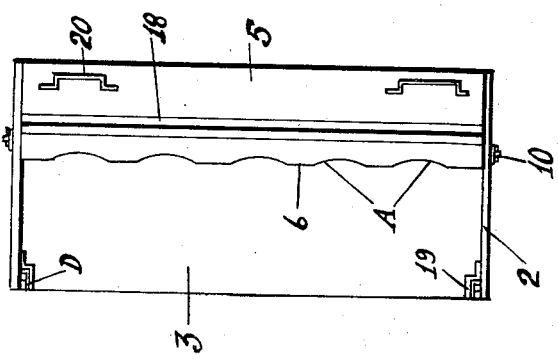
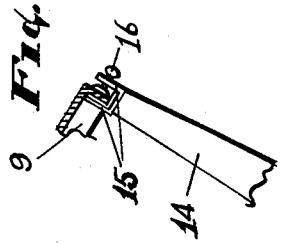
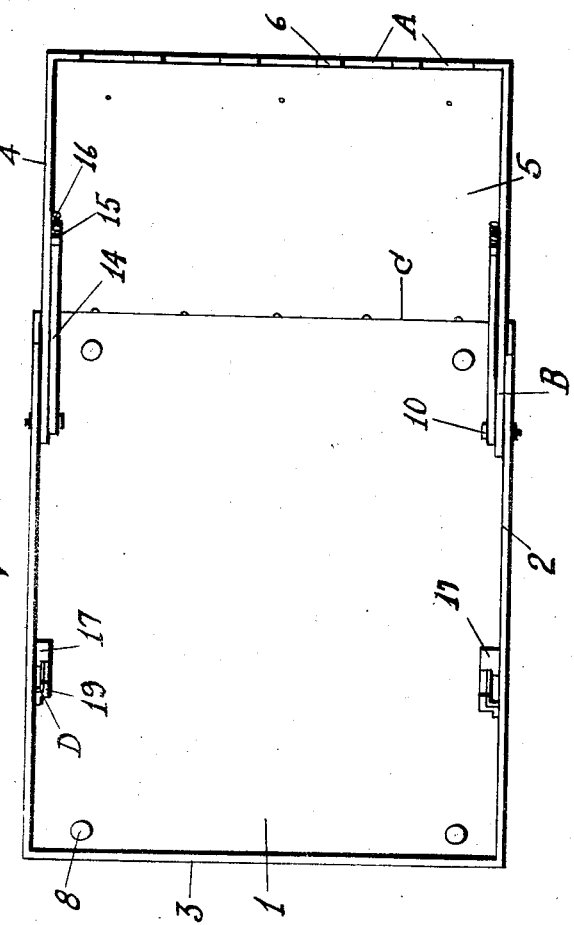
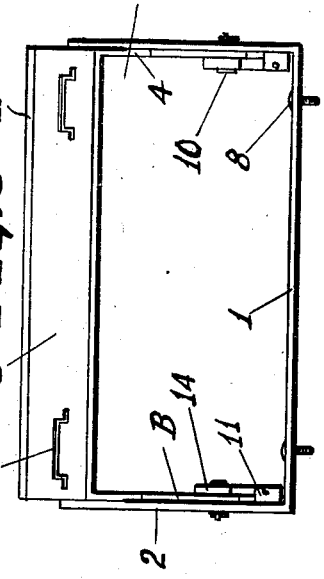
INVENTOR.
L. H. ROBERTS
BY
ATTORNEY.

Patented Feb. 4, 1941

2,230,334

UNITED STATES PATENT OFFICE 2,230,334

FOLDABLE CONTAINER FOR THE BODY OF MOTOR-DRIVEN VEHICLES

Leslie H. Roberts, McPherson, Kans.

Application June 7, 1940, Serial No. 339,353

2 Claims. (Cl. 296—26)

My invention relates to a foldable container for the body of motor-driven vehicles, and has for its principal object to provide a collapsible container that will unfold for increased carrying capacity and folded within, and being concealed by the luggage compartment at the rear of an automobile body, and furthermore when of folded will not obstruct accessibility to the interior of the container when the lid enclosure of the vehicle is opened.

A further object of my invention is to provide a container adaptable to seat in the body of the vehicle without alteration, or defacing the body of the vehicle other than to provide ample anchoring means for the container to the floor of the vehicle body.

A still further object of my invention is to provide an inexpensive container, easily installed and removed, also being void of excess vibration when the pivotally connected extension is rocked inward of the vehicle body.

These and other objects will hereinafter be more fully explained, reference being had to the accompanying drawings forming a part of this specification, in which like characters will apply to like parts in the different views.

Referring to the drawings:

Fig. 1 is a fragmentary side view of a motor-driven vehicle and container carried thereby, the latter sectionally shown.

Fig. 2 is a plan view of the container.

Fig. 3 is a rear view of the container as folded.

Fig. 4 is an enlarged view of the supporting means for the lid of the rear compartment when the container is unfolded.

Fig. 5 is a rear view of the container as unfolded.

My invention herein disclosed relates to a jointed container to be installed in the rear compartment of a motor-driven vehicle, commonly termed as a coupe, said container being comprised of a stationary portion and a rockable portion, the latter as an extension for the container. The stationary portion has a bottom 1, sides 2, and an end wall 3, the rockable portion having side walls 4 and an arcuate bottom 5, the outer extremity of which has a turned-up lip 6 having a series of depressions A spaced therealong as seating means for pipes or the like extending outward and rearward from the container. The stationary portion is secured to a floor 7 of the vehicle body by bolts 8, the said container adapted to fit within walls of the vehicle body while the upper edge portion of the container is arced and spaced downward to clear the lid 9 of the compartment, and the bottom of the rockable portion when folded will conform closely to that of said lid; consequently, the container may be concealed when the lid is closed and the said pivotally connected portion has a leg for each side, as at B, the inner extremity of which is pivotally connected to the side walls of the stationary portion by pins 10 extending through said walls, respectively, while the bottom of each portion, when rocked outward as shown in Fig. 1 will abut in registry as at C and secured to snug engagement by a pair of ears 11 and 12 on each side of the container that are bored in axial alignment through which a cotter pin 13 will engage to avoid separation of the said joint as ears 11 are secured to the side walls of the stationary portion while ears 12 are secured to the side walls of the extension.

As a means to retain the lid in an open position as illustrated in Fig. 1, I have pivotally connected an arm 14 to each of said pins, the outer end of said arms each having a pair of jaws 15 to straddle the lower extension of the lid and being secured thereto by a set screw 16, and when said arms are disengaged from the lid they may be rocked inward to seat on a plate 17 laterally extending inward from each wall.

As an anti-rattler for the rockable extension when rocked inward there is placed on its bottom a spaced distance inward from its outer extremity a rubber strip 18 secured to the bottom to function as a cushion should the extension rebound toward the lid, which otherwise would contact therewith, and furthermore there is positioned on the inside of each wall of the stationary portion near the upper edge thereof a shouldered lip 19 that is rubber lined as at D on which the wall edges of the extension will seat as shown by dotted lines E as a second anti-rattler and furthermore the shouldered lips to function as a stop against further rocking movement of the extension, and the pivot point of the said extension being spaced inward and upward by virtue of its legs is means to space the inner edge of the bottom of the rockable extension well upward when the said portion is rocked to its extremity inward; being so arranged, is means for accessibility to the interior of the container without serious obstruction as shown in Fig. 3 when the lid is opened.

It will now be seen that luggage of other description such as trunks, suitcases or the like may be stored in the usual manner had the above described container not been installed.

Secured to the bottom of the extension is a pair of U-shaped handles 20 as a gripping means to rock the extension inward and outward, and also to remove the container from the vehicle if such is required.

To facilitate for the use of a crane to remove heavy articles from the container it will be required that the lid should be rocked to a vertical position to avoid obstruction, in which case, the rule back jointed support commonly employed should be replaced by a similar device whose legs are increased in length, and being so arranged will not obstruct when the lid is closed. This arrangement however is optional as derricks may be arranged to conform to the normally open position of the lid, and while I have shown and described certain portions with respect to the length of the body portions pivotally connected, the same may be varied as the trade requires, and furthermore the luggage compartment may be lined to substitute the stationary portion of the container, conforming to varying designs of the so-called turtle backs of coupes, which is the preferred vehicle in which to position the invention herein disclosed, and such other modifications may be employed as lie within the scope of the appended claims.

Having fully described my invention what I claim as new, and desire to secure by Letters Patent is:

1. In a foldable container for the body of motor-driven vehicles, consisting of two portions, one of which is stationarily positioned within the body of an automobile rearwardly thereof, and bolt means to secure the portion against removal, said portion comprised of a bottom, one end and two side walls, integrally joined, the other end being open to abut the open end of the other portion, the other portion comprised of an arcuate bottom and two sides oppositely disposed and a lip crossing one end transverse to the sides, said sides and lip integrally joined to their respective edges of the bottom, the lip having a plurality of depressions spaced along its upper edge, the other end being open and each side at their corresponding free ends having an arm outwardly extending and being aligned with the upper edge of their respective sides, the outer ends of the arms each being pivotally connected to its respective side of the stationarily positioned portion whereby when the said other portion is rocked to lapped engagement on the upper extremity of the stationarily positioned portion, the bottom of each container will be well spaced apart and open at the rear when thus lapped.

2. In a foldable container for a luggage compartment of the body of a motor-driven vehicle, said luggage compartment being at the rear of the vehicle body and the said luggage compartment comprising a floor, two sides and a hingedly connected lid as an enclosure for the compartment, the upper extremity of the compartment and its lid being arcuate, the directional trend of which is rearward and downward to where the lid meets the floor of the vehicle, the container comprised of two portions pivotally connected, one portion adapted to fold upon the other in such a way that both of said portions as folded will seat in the said compartment of the vehicle body and being completely concealed therein when the lid is closed, one of said portions being rigidly secured within the said luggage compartment while the other portion is adapted to rock to an outward position when the lid is opened, and an arm pivotally connected to each side of the stationary portion of the container as supporting means for the lid in its open position to secure the lid from contact with luggage positioned in the container and also to permit loading of the luggage, and means to secure the abutting edges of the bottoms to snug engagement when the container is unfolded.

LESLIE H. ROBERTS.